United States Patent [19]
Tomita et al.

[11] 4,284,178
[45] Aug. 18, 1981

[54] HYDRAULIC SHOCK ABSORBER

[75] Inventors: Takao Tomita, Niiza; Masao Hiruma, Kawajima, both of Japan

[73] Assignee: Honda Giken Kogyo Kabushiki Kaisha, Tokyo, Japan

[21] Appl. No.: 65,344

[22] Filed: Aug. 9, 1979

[30] Foreign Application Priority Data

Aug. 11, 1978 [JP] Japan .................. 53-97860

[51] Int. Cl.³ .................... F16F 9/34; F16F 9/36
[52] U.S. Cl. .................... 188/281; 188/314
[58] Field of Search .......... 188/281, 282, 284, 285, 188/313, 314, 315, 316, 317

[56] References Cited

U.S. PATENT DOCUMENTS

| 2,144,153 | 1/1939 | Henning | 188/317 |
| 2,723,007 | 11/1955 | Lanphere | 188/313 |
| 3,268,037 | 8/1966 | Menar | 188/282 |
| 3,299,990 | 1/1967 | Ratcliffe | 188/317 |

FOREIGN PATENT DOCUMENTS

| 939657 | 2/1956 | Fed. Rep. of Germany . | |
| 601037 | 2/1926 | France | 188/317 |
| 825969 | 3/1938 | France | 188/315 |
| 2208070 | 6/1974 | France . | |

*Primary Examiner*—Edward R. Kazenske
*Attorney, Agent, or Firm*—Irving M. Weiner; Pamela S. Burt; John L. Shortley

[57] ABSTRACT

A hydraulic shock absorber which includes a first cylinder closed at the top thereof and having a piston rod which axially extends from the top of the first cylinder and through the interior thereof and provided at the lower end with a piston; and a second cylinder closed at the bottom and telescopically received within the first cylinder. The second cylinder is provided with two radial partition walls having respective hole portions defining oil paths between them and the piston rod. A ring-like elastic member is fitted on the piston rod within a chamber defined between the two partition walls so as to function as a check valve for the oil paths defined between the hole portions in the partition walls and the piston rod. The piston rod is provided with an inner oil path extending therethrough and with a check valve arranged in the inner oil path, thereby compensating for a loss of damping function when the oil path around the piston rod is closed.

16 Claims, 19 Drawing Figures

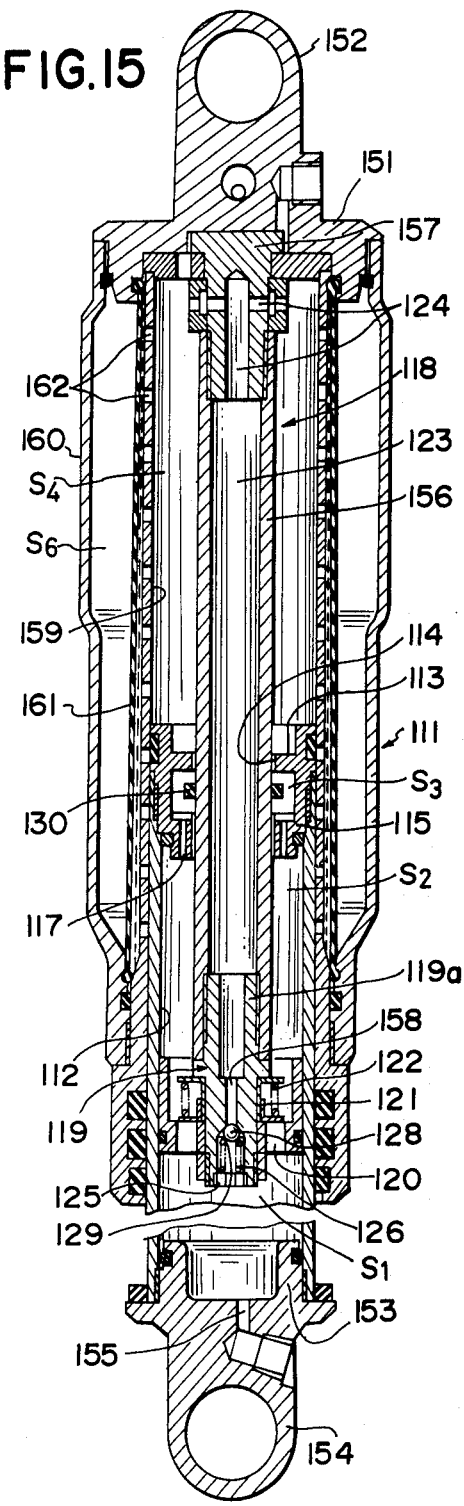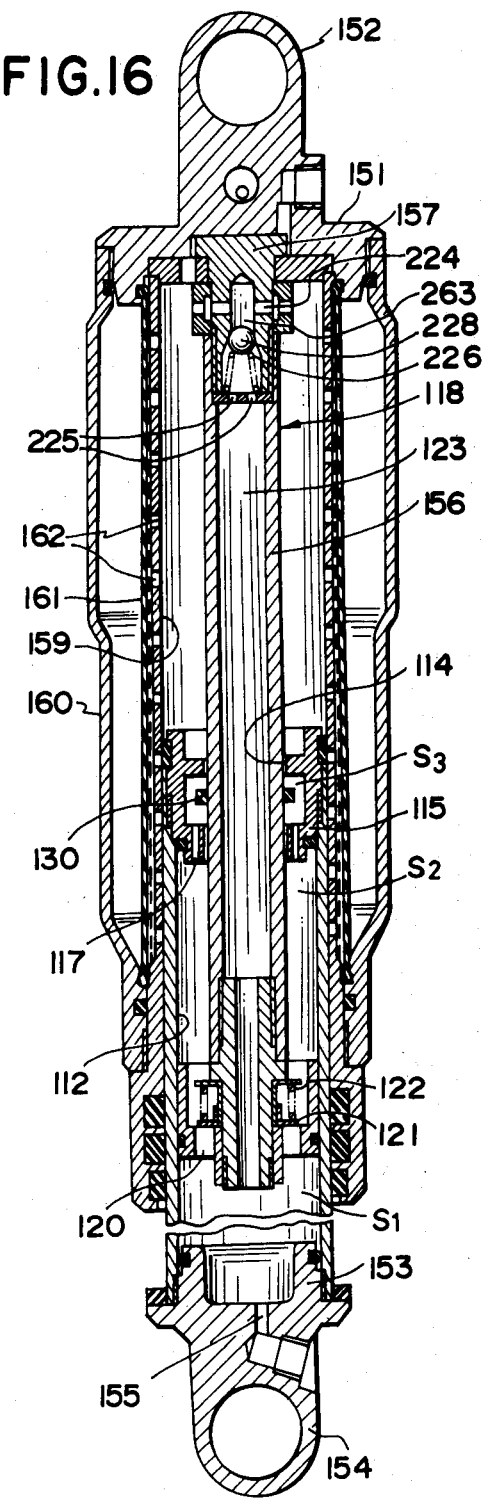

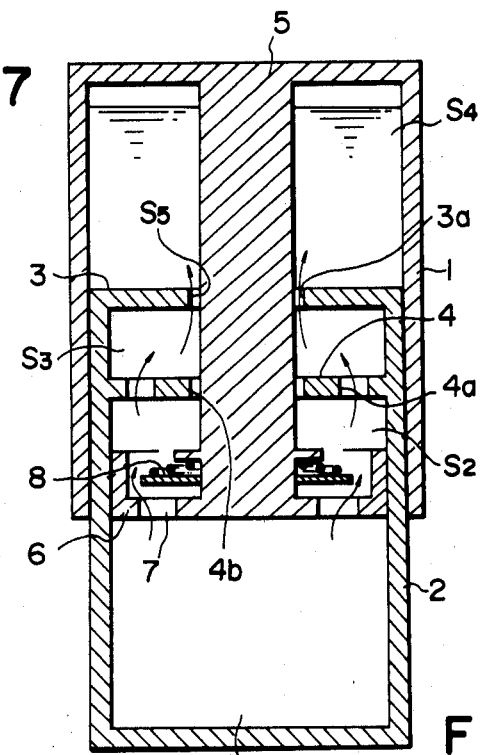
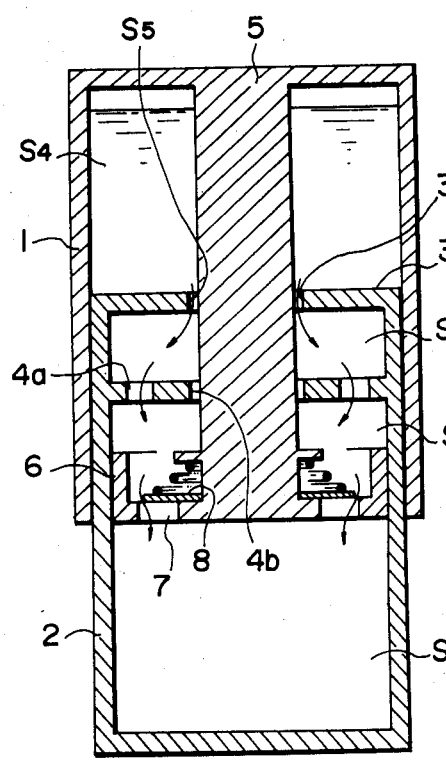
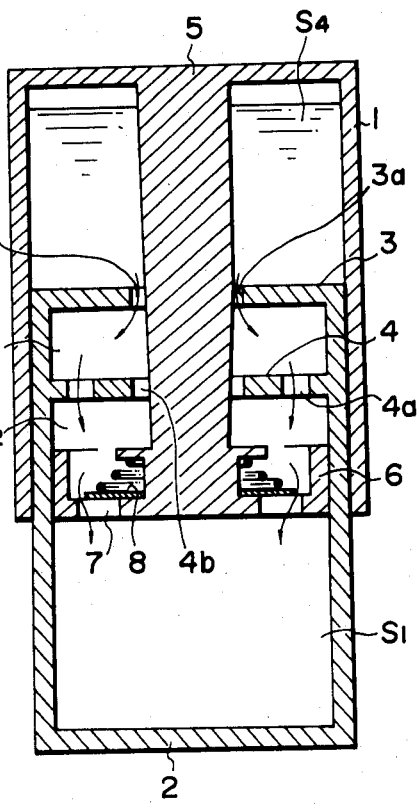

HYDRAULIC SHOCK ABSORBER

BACKGROUND OF THE INVENTION

The present invention relates to improvements in a hydraulic shock absorber having telescoping inner and outer hollow cylindrical bodies wherein the inner cylindrical body is provided with a radial partition wall through which a piston rod axially extends from the top wall of the outer cylindrical body.

In order to facilitate a thorough understanding of the advantageous functioning of the shock absorber of the present invention as described in detail hereinbelow, an exemplary shock absorber construction is schematically illustrated in FIGS. 17-19 of the accompanying drawings so as to emphasize some of the disadvantages which might be encountered in a shock absorber which does not incorporate all of the features of the present invention. Such exemplary hydraulic shock absorber illustrated in FIGS. 17-19 includes a piston rod which extends through a hole formed in a partition wall dividing an enclosed cylindrical space, and is adapted to provide a hydraulic damping force at the clearance between the piston rod and the partition wall in either a contraction or an extension stroke.

As shown in FIGS. 17 and 18 the exemplary hydraulic shock absorber comprises outer and inner cylinders 1 and 2, respectively. The inner cylinder 2 has an upper partition wall 3 and a lower partition wall 4 provided with radially spaced oil paths 4a. The outer cylinder 1 has a piston rod 5 axially extending from the top wall thereof and penetrating holes 3a and 4b formed respectively in partition walls 3 and 4. The piston rod 5 is provided at the lower end thereof with a piston 6 provided with radially spaced oil paths 7 and with a slidable check valve 8, there being a clearance provided between check valve 8 and a radially outer edge portion of each oil path 7.

In such type of hydraulic shock absorber, with the descent of the piston 6 during the compression stroke, oil in a lower section $S_1$ lifts up the check valve 8 and flows through the paths 7 into a first intermediate section $S_2$ and thereafter through the paths 4a into a second intermediate section $S_3$. The oil further flows through the clearance $S_5$ defined between the piston rod 5 and the hole 3a of partition wall 3 into an upper section $S_4$ as shown in FIG. 17. In such flow of oil the rate of flow is controlled by the clearance $S_5$, and a damping force in the compressing direction is obtained in such portion. The clearance $S_5$ functions in effect as an orifice.

During the extension stroke on the other hand, oil in the upper section $S_4$ is caused to flow through the clearance $S_5$, through the oil paths 4a in lower partition wall 4, through the paths on the outer periphery of check valve 8, and into the lower section $S_1$ as shown in FIG. 18, to provide a damping force.

With such shock absorber, the clearance $S_5$ serves as an oil path during both the compression and the extension strokes. Because clearance $S_5$ provides the same sectional area for both strokes, it is difficult to obtain a satisfactory damping force characteristic in the extension stroke. In practice, different damping characteristics are required for the compression stroke and for the extension stroke. However, with the above-described shock absorber in which the rate of oil flow is controlled by the same clearance in both the compression and the extension strokes, assuming that satisfactory performance can be provided for either one of the two strokes, unsatisfactory performance can be expected in the other stroke.

In the event that a variable orifice is provided by using a piston rod 5 as shown in FIG. 19, such piston rod 5 being tapered or having a sectional area which varies continuously over its length, the clearance $S_5$ is progressively reduced and the damping force is progressively increased as the piston rod descends in the compression stroke, so that a satisfactory damping characteristic can be obtained. In the extension stroke, however, with the relative ascent of piston rod 5, the sectional area of the clearance $S_5$ is increased. Therefore, the damping force is quickly reduced, causing the inner and outer cylinders 1 and 2 to be quickly extended. As a result, sudden tossing or impelling forces in the extending direction are felt. Thus, it is difficult to obtain a satisfactory damping function in the extension stroke.

With such construction, which includes a variable orifice between the piston rod 5 and hole 3a by providing the tapered piston rod, satisfactory performance can be obtained in only one of the two strokes and it is difficult to obtain satisfactory damping performance for both the compression and extension strokes.

The present invention effectively solves the foregoing problems associated with known hydraulic shock absorber constructions, while at the same time providing a simplified construction having excellent shock-absorbing qualities.

SUMMARY OF THE INVENTION

The present invention provides a hydraulic shock absorber which comprises telescoping inner and outer cylinders, a first one of the cylinders including a piston rod extending axially in the cylinder and provided with a piston. A second one of the cylinders includes a first radial partition wall formed with a hole through which the piston rod extends and dividing the enclosed space defined by the inner and outer cylinders. The second cylinder also includes a second radial partition wall extending between the first partition wall and the piston and penetrated by the piston rod, and an elastic ring member closely and slidably fitted on the piston rod between the first and second partition members such that the elastic ring member can be forced to slide along the piston rod in relation to the movement of the piston rod.

An important object of the invention is to provide a hydraulic shock absorber in which the clearance defined between a hole formed in a partition member and a piston rod extending therethrough is adapted to be held open and serve as an oil path in one of the two strokes and closed in the other stroke, so as to provide different damping characteristics between two strokes. Such feature is attained by the structurally simple means of fitting an annular elastic member on the piston rod. The present invention is particularly applicable to a type of hydraulic shock absorber which includes a variable orifice formed by a tapered rod or a similar rod having the sectional area thereof varying over its length.

A further object of the invention is to provide a hydraulic shock absorber in which, in order to compensate for the loss of damping function when the clearance between the piston rod and the hole in the partition wall is closed by the elastic member in one of the two strokes, the piston rod is provided with an inner oil path in place of the clearance and is provided with a check valve in the inner oil path.

Another object of the invention is to provide a hydraulic shock absorber in which the above-described second partition wall is provided with a cylindrical wall adapted to surround the elastic member to prevent adverse effects on the elastic member of jet flow during damping action, so as to improve the function of the elastic member.

The above and other objects, advantages and details of the invention will become apparent from the following detailed description of preferred embodiments of the invention when the same is read with reference to the accompanying drawings.

BRIEF DESCRIPTION OF THE DRAWINGS

FIG. 15 is an axial sectional view, partly broken away, showing an embodiment of the hydraulic shock absorber according to the invention.

FIG. 16 is a view similar to FIG. 15, showing a modification of the embodiment of FIG. 15.

FIGS. 17 through 19 are views showing exemplary hydraulic shock absorbers.

DETAILED DESCRIPTION OF PREFERRED EMBODIMENTS

Figure 1:
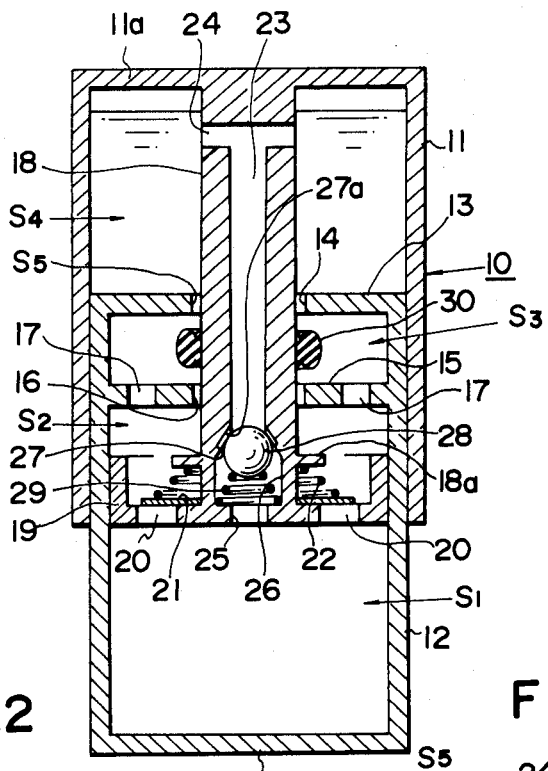
FIG. 1 is a schematic axial sectional view of a hydraulic shock absorber according to the invention.
Figure 2:
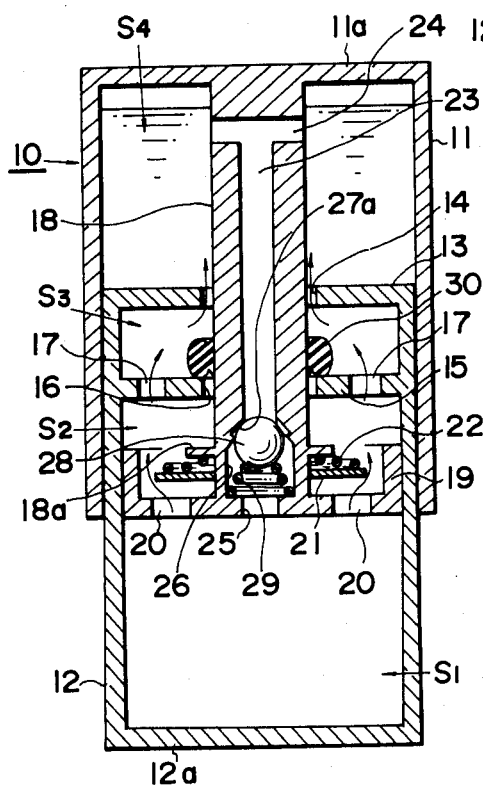
FIG. 2 is a view similar to FIG. 1, showing the same shock absorber during the compression stroke.
Figure 3:
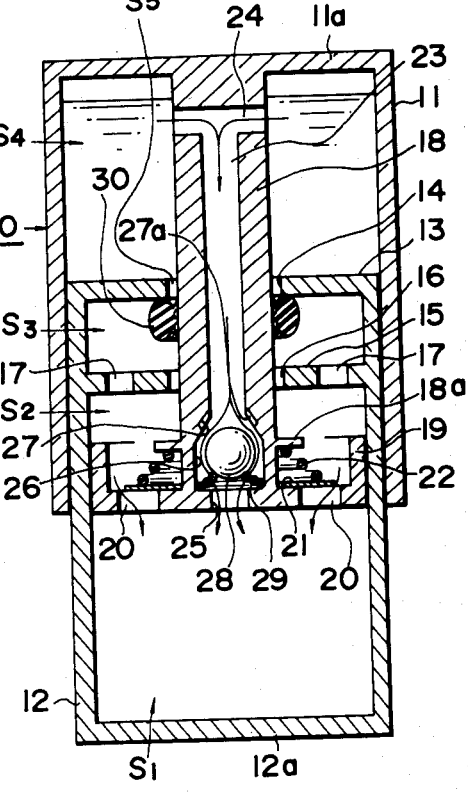
FIG. 3 is a view similar to FIG. 1, showing the same shock absorber during the extension stroke.

FIGS. 1 through 3 schematically illustrate the principles of a hydraulic shock absorber according to the invention. FIG. 1 shows the shock absorber in the central position thereof; FIG. 2 shows the shock absorber in the compression stroke position thereof; and FIG. 3 shows the shock absorber in the extension stroke position thereof.

The hydraulic shock absorber 10 comprises telescopically connected outer and inner cylinders 11 and 12, respectively. The outer cylinder 11 may be coupled, for example, to the body side of a vehicle, and the inner cylinder 12 to the wheel side, so that the shock absorber constitutes a portion of the vehicle suspension.

Inner cylinder 12 has a top wall defining a first partition wall 13 formed with a central through hole 14. The cylinder 12 also has a second partition wall 15 extending below and spaced apart from the first partition wall 13, and formed with a central through hole 16. The second partition wall 15 is also formed with a plurality of radially spaced oil path apertures 17. Inner cylinder 12 is closed at the bottom thereof with a bottom wall 12a.

The outer cylinder 11 includes a top wall 11a. A piston rod 18 depends from the top wall 11a and extends through holes 14 and 16 of the respective partition walls 13 and 15. The piston rod 18 is provided at its lower end with a piston 19, which is disposed below the second partition wall 15. The piston 19 has a plurality of radially spaced oil paths 20, and a slidable check valve 21 provided above oil paths 20. The diameter of check valve 21 is smaller than the diameter of a circle circumscribing the radially spaced oil paths 20, to provide clearances for oil flow between the outer periphery of check valve 21 and an outer edge portion of each of the oil paths 20. Oil can flow through such clearances during reciprocating movement of the shock absorber. It is contemplated that notches may be provided on the outer periphery of the check valve or on the inside wall of the oil path, in place of the above-described clearances, with similar effects being obtained. The check valve 21 is spring-biased in the closing direction by a spring 22 interposed between a retainer 18a provided on a lower portion of piston rod 18 and the valve 21.

Although the piston rod 18 actually has a tapered form with the diameter thereof being progressively reduced from the proximal toward the distal end thereof, rod 18 is depicted as having a substantially constant diameter over its length because it would be impossible to illustrate such a taper without an extremely exaggerated taper form in the schematic views. Thus, it is to be understood that the present embodiment employs a tapered piston rod. However, it is of course possible to use a piston rod having a constant diameter over the entire length thereof.

The piston rod 18 is provided with a passage 23 axially formed therethrough and serving as an oil path which communicates with a lower chamber $S_1$ through an opening 25 provided at its lower end and with an upper chamber $S_4$ through passage 24 radially formed in piston rod 18 adjacent the upper end of passage 23. The oil path 23 has an increased-diameter space 26 which is defined at the lower end thereof by an end wall defining the opening 25 and at the upper end thereof by a conical-shaped wall 27 serving as a valve seat. A check valve 28, in the form of a ball valve for example, is provided within the space 26. The valve 28 is normally urged against the valve seat 27 by a spring 29 interposed between the valve and the end wall defining the opening 25, so as to normally close the lower end of oil path 23. The opening 25 has a diameter smaller than that of the valve 28. Grooves 27a are provided in the valve seat 27 to prevent permanent locking of the valve seat 27 by the ball 28.

An elastic ring member 30 made of rubber or like material is closely and slidably fitted with a necessary binding force on a portion of piston rod 18 between the first and second partition walls 13 and 15 such that it can be forced to slide along piston rod 18 to a limited extent.

Working oil is provided within the sealed space defined by the outer and inner cylinders 11 and 12.

The operation of the above-described hydraulic shock absorber is as follows.

FIG. 1 shows the shock absorber in its central position, i.e., in a state of no hydraulic damping operation, with the elastic member 30 disposed at a position within chamber $S_3$ substantially centrally between the first and second partition walls 13 and 15.

FIG. 2 shows the state of the shock absorber 10 during the compression stroke. In such state, the outer and inner cylinders 11 and 12 are relatively moved toward each other, and consequently the piston rod 18 is relatively lowered together with the piston 19. The piston 19 thus approaches the bottom wall 12a of inner cylinder 12, and the partition wall 13 of inner cylinder 12 approaches the top wall 11a of outer cylinder 11.

In such compression stroke, the check valve 28 closes the oil path 23, and oil in the lower chamber $S_1$ under the piston 19 is displaced upwardly and flows through the oil paths 20 into an intermediate chamber $S_2$ by lifting up check valve 21 against the spring 22. With the descent of piston rod 18, the clearance defined by through hole 16 in partition wall 15 is closed by the elastic member 30, so that oil flows into intermediate chamber $S_3$ through oil paths 17. In this compression stroke, the clearance $S_5$ defined between through hole 14 of partition wall 13 and piston rod 18 remains open, so that oil flows through clearance $S_5$ into upper chamber $S_4$. Thus, during the compression stroke in this embodiment the rate of oil flow is controlled by the system including the clearance $S_5$. Because the outer diameter of piston rod 18 is varied over the length thereof as described hereinabove, the sectional area of clearance $S_5$ is gradually reduced with the lowering of piston rod 18 during the compression stroke, and clearance $S_5$ thus serves as a variable orifice. Thus, with the downward progress of piston rod 18, the rate of oil flow is controlled such that the damping force is progressively increased. In this manner, a desirable damping characteristic can be obtained in the compression stroke.

FIG. 3 shows the extension state of the shock absorber. In this state, the outer and inner cylinders 11 and 12 are relatively moved away from each other, and piston rod 18 and piston 19 are raised. With the ascent of piston rod 18, elastic member 30 is also raised together therewith until it butts against partition wall 13 to close clearance $S_5$. With further ascent of piston rod 18 and piston 19, elastic ring member 30 is caused to relatively slide along piston rod 18. Thus, in the extension stroke, elastic member 30 serves as a check valve for closing the orifice formed by clearance $S_5$. In this manner, quick reduction of the damping force in the extending direction due to an increase of the sectional area of the variable orifice is prevented. At this time, however, elastic member 30 acts to lock the hydraulic shock absorber against extension, and this locking effect is compensated for as set forth hereinbelow.

In the initial state of the extension stroke, i.e., before the clearance $S_5$ is closed by elastic ring member 30, the damping force is provided by the system including the clearance $S_5$ and oil paths 20 throttled by the slidable check valve 21. When the clearance $S_5$ is closed, oil in upper chamber $S_4$ now employs for downward displacement thereof the route including the radial passage 24 and axial passage 23 and forcibly lowers check valve 28 against spring 29 to release same from valve seat 27. Thus, the upper chamber $S_4$ and the lower chamber $S_1$ under piston 19 communicate with each other to provide a smooth extension effect.

As set forth above, a controlled damping force is provided by the clearance defined between the through hole in the upper partition wall and the piston rod only in the compression stroke, and in the extension stroke this system is switched over to a separate system for providing a desired steady damping force, with the elastic ring member serving as a check valve for closing the orifice only at the time of the extension stroke.

While in the above embodiment the check valve is provided adjacent to the lower end of the oil path formed in the piston rod, it is also possible to provide a check valve adjacent to the upper end of oil path 23.

The elastic ring member 30 is fitted on the piston rod with a sufficient binding force to force it to slide along the piston rod, and the sectional area thereof must be selected to meet these requirements. When an O-ring is used, an oil film is formed between the O-ring and piston rod and greatly reduces the frictional force therebetween. Even if the binding force of the O-ring is excessively increased, sufficient effects cannot be expected.

FIGS. 4 through 9 show various examples of the elastic ring member which may be used in accordance with the invention.

Figure 4:
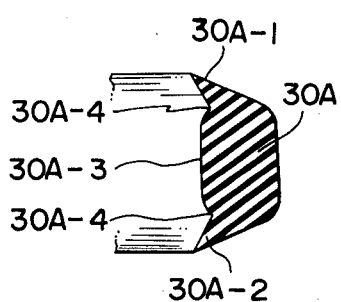
FIGS. 4 through 9 are enlarged fragmentary sectional views showing respective examples of an elastic member according to the invention.

The elastic ring member 30A shown in FIG. 4 has radially inner upper and lower lip portions 30A-1 and 30A-2 having respective sharp edges directed radially inwardly and an inner intermediate flat protruded portion 30A-3 with valleys 30A-4 formed on both sides of the protruded portion to facilitate flexing of the lip portions. With such construction the lip portions 30A-1 and 30A-2 respectively protrude into and seal the clearance $S_5$ and into the clearance defined between the hole 16 in the second partition wall 15 and the piston rod 18 with reciprocation thereof.

Figure 5:
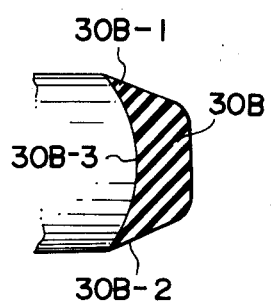

The elastic ring member 30B of FIG. 5 has an inner concave surface 30B-3 with lip portions 30B-1 and 30B-2 formed at the upper and lower edges.

Figure 6:
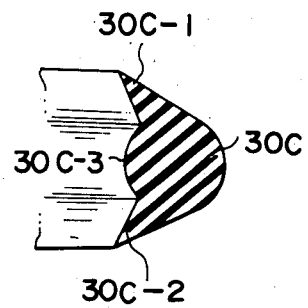

The elastic ring member 30C of FIG. 6 has inner upper and lower lip portions 30C-1 and 30C-2 and an inner intermediate convex portion 30C-3.

Figure 7:
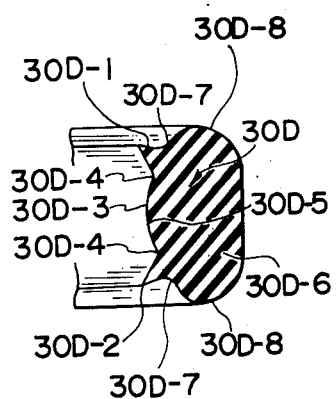

The elastic ring member 30D of FIG. 7 has a substantially oval sectional profile with the long axis thereof extending parallel to the axis of the piston rod. Member 30D has an inner protruded portion 30D-5 which includes upper and lower lip portions 30D-1 and 30D-2 and an intermediate convex portion 30D-3. The axial dimension between the edges of the lip portions 30D-1 and 30D-2 is smaller than the length dimension of the outer main body 30D-6 of the ring, and a valley 30D-7 is defined between the main body 30D-6 and each lip portion to facilitate the flexing of the lip portion. With this construction, the lip portions 30D-1 and 30D-2 closely engage the outer periphery of the piston rod, while upper and lower end portions 30D-8 of the main body 30D-6 are adapted to closely engage the lower surface of the first partition wall 13 and the upper surface of the second partition wall 15 respectively, thus further increasing the sealing effect together with that provided by the lip portion.

Figure 8:
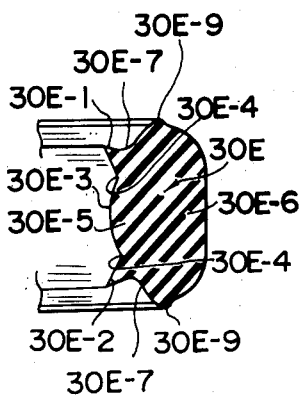

The elastic ring member 30E of FIG. 8 is a modification of the FIG. 7 embodiment, and like parts are designated by like reference numerals. In this member, the main body 30E-6 is provided with upper and lower ridges 30E-9.

Figure 9:
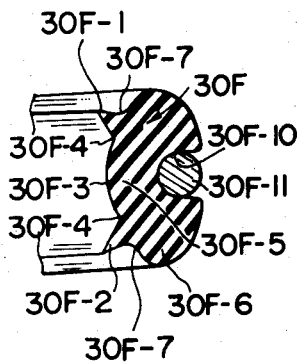

The elastic ring member 30F of FIG. 9 comprises another modification of the FIG. 7 embodiment, and like parts are designated by like reference numerals. In this modification, the main body 30F-6 is formed with an outer annular groove 30F-10, and a spring ring 30F-11 is fitted therein. With this construction, it is possible to correct permanent strain which may result when a rubber material is employed as the elastic ring member, and to improve and maintain the binding force of the elastic member. It will be understood that such construction (i.e., an annular groove with a spring ring fitted therein) may be employed as desired in conjunction with the elastic ring member according to the invention regardless of the particular configuration of the ring member.

The above examples of the elastic ring member are illustrative of preferred constructions, however, any suitable elastic ring member construction may be employed.

A further aspect of the invention will now be described with reference to FIGS. 10 through 14.

Figure 10:
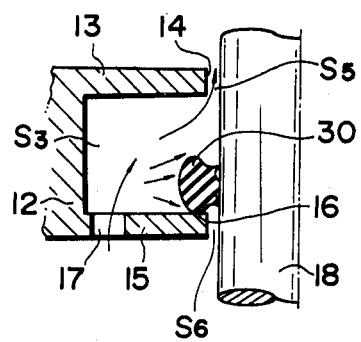
FIG. 10 is an enlarged fragmentary sectional view illustrating the relation between turbulent flow and the elastic member.

FIG. 10 shows an arrangement having an attendant problem which is solved according to the invention, and illustrates first and second partition walls 13 and 15 and piston rod 18.

At the time of descent of piston rod 18, i.e., during the compression stroke, the elastic member 30 closes the clearance $S_6$ defined between the second partition wall 15 and the piston rod 18, and oil is permitted to flow through the oil path apertures 17, chamber $S_3$ and clearance $S_5$ defined between the hole 14 of the first partition wall 13 and piston rod 18, whereby a controlled damping force can be obtained. Because clearance $S_5$ is closed during the compression stroke, oil which enters into chamber $S_3$ through oil path apertures 17 strikes the elastic member 30 as a jet flow, and is likely to cause defective sealing of elastic ring member 30 or reduction of the binding force thereof. Thus, a binding force which surpasses the effect of the jet flow is required for the elastic member. FIGS. 11 through 14 show exemplary solutions of such problem.

Figure 11:
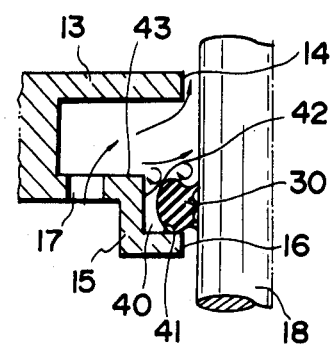
FIGS. 11 through 14 are views similar to FIG. 10, showing respective modifications of the arrangement of FIG. 10.

In FIG. 11, the second partition member 15 is provided with a central stepped or depressed portion 40 having the bottom 41 thereof formed with the above-described through-hole 16. The inner diameter of the vertical wall 42 is made sufficiently greater than the outer diameter of elastic member 30. The oil path apertures 17 are provided in a portion 43 of partition wall 15 located outwardly of stepped portion 40. The depth of stepped portion 40 is made equal to or slightly greater than the height dimension of elastic member 30.

With such arrangement, because elastic ring member 30 is accommodated in stepped portion 40 and is located downwardly of oil path apertures 17, the above-described jet flow of oil into the chamber $S_3$ through oil path apertures 17 does not directly act upon elastic member 30, so that it is possible to maintain the proper binding force of the elastic member.

Figure 12:
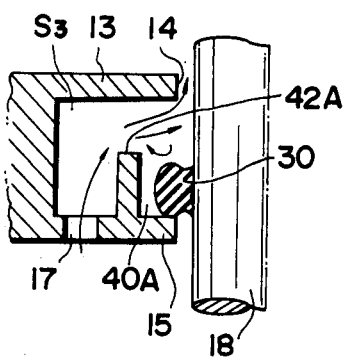

In FIG. 12, the second partition wall 15 is provided on the inner side of oil path apertures 17 with a ring-like vertically upwardly extending wall 42A, to permit elastic member 30 to be accommodated during the compression stroke within the inner space 40 surrounded by wall 42A. With such arrangement, the member 30 can be protected from the jet flow of oil.

Figure 13:
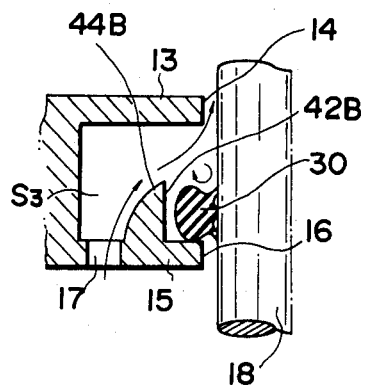

FIG. 13 shows a ring-like wall 42B similar to wall 15 in FIG. 12 but having a curved outer surface 44B, the outer diameter of which is progressively reduced in an upper direction. The curved outer surface 44B functions to smoothly guide the stream of oil flowing through oil path apertures 17 into chamber $S_3$, thus preventing adverse effects of the jet flow on elastic member 30.

Figure 14:
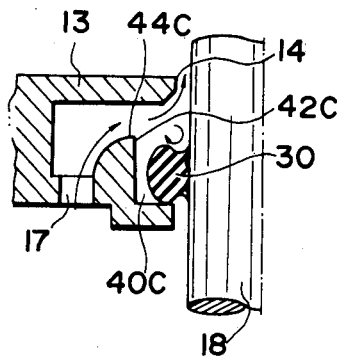

FIG. 14 depicts a combination of the FIGS. 11 and 13 embodiments. More particularly, the second partition wall 15 is provided with a central depresssed or stepped portion 40C having a ring-like wall 42C extending upwardly from the upper surface of wall 15 and having a curved outer surface 44C similar to surface 44B of FIG. 13. With this arrangement, similar effects can be obtained. Further, a sufficient depth of stepped portion 40C accommodating elastic member 30 can be obtained with a reduced height of wall 42C, while ensuring a smooth flow of oil.

The basic construction according to the invention has been described in connection with schematic views depicted in FIGS. 1 through 14. Specific examples of the hydraulic shock absorber embodying the invention will be described hereinbelow.

FIG. 15 shows a specific embodiment of the invention which comprises outer and inner cylinders 111 and 112. The outer cylinder 111 is provided with a top plug member 151 having an integral upper bracket 152 for mounting the shock absorber on the vehicle body side. Inner cylinder 112 is sealed at the lower end thereof with a bottom plug member 153 having an integral bracket 154 for mounting on the wheel side, and formed with an oil supply port 155 therein. Outer cylinder 111 is provided with a piston rod 118 suspended from the center of the underside of plug member 151. Piston rod 118 comprises a pipe member 156 threadedly secured, or otherwise secured, at the upper end thereof to a base member 157. Base member 157 is in turn threadedly secured, or otherwise secured, to plug member 151 and is provided with a radial passage 124 providing communication between an upper chamber $S_4$ and an axial passage 123 provided through pipe member 156.

The piston rod 118 is provided at the lower end thereof with a piston 119, which is a separate member and is threadedly secured to pipe member 156 at a boss portion 119a. The piston 119 has a lower central opening 125 which opens into a lower chamber $S_1$ and communicates with an increased-diameter space 126 which is formed at the lower terminal of a narrow neck-like path 128 communicating with passage 123. A check valve 128 in the form of a ball is provided within the increased-diameter space 126 and is spring-biased by a spring 129.

The inner cylinder 112 is provided in the upper portion thereof with an upper partition wall 113 formed with a central hole 114 and also provided with a lower partition wall 115. The lower partition wall 115 is formed with a plurality of radially-spaced oil path apertures 117 providing communication between lower and upper intermediate chambers $S_2$ and $S_3$, and an elastic ring member 130 is slidably fitted on piston rod 118 and is disposed within the upper intermediate chamber $S_3$.

The outer cylinder 111 comprises an inner member 159 telescopically fitted on inner cylinder 112, and an outer member 160 defining an enclosed space between the inside thereof and the outer periphery of inner member 159. A cylindrical film member 161 made of a flexible material is interposed between the inner and outer members 159 and 160 in such a manner as to provide a hermetical seal between such members. The inner member 159 is provided with a plurality of communication holes 162 communicating with chamber $S_4$ and outside of member 159. The space defined by an upper portion of film member 161 including chamber $S_4$ is filled with a gas under comparatively low pressure, and the space on the outside of film member 161 is filled with a gas under a comparatively high pressure.

The operation of the above construction is similar to that described hereinabove, with the elastic ring member 130 functioning as a check valve for closing the clearance defined between the hole 114 in the partition wall 113 and the piston rod 118 in the extension stroke.

The present embodiment comprises a shock absorber of a combined pneumatic and hydraulic type, and at the time of the compression stroke, gas within upper chamber $S_4$ is compressed to cause swelling of the cylindrical film member 161 so as to compress gas in a chamber $S_6$ on the outer side of film member 161, thereby obtaining a damping force under combined pneumatic and hydraulic control.

FIG. 16 shows a modification of the embodiment of FIG. 15. Because the embodiment of FIG. 16 is basically the same in construction as the embodiment described above with reference to FIG. 15, like parts are designated by like reference numerals.

In the embodiment of FIG. 16, a check valve is provided at the upper end of passage 123 which extends through piston rod 118. More particularly, piston 119 has only a central communication passage without any check valve. A base member 157 of piston rod 118 is provided therein with an axial blind bore 263 closed at the upper end thereof and including an increased-diameter space 226 communicating through openings 225 with passage 123 of pipe member 156 of piston rod 118. The base member 157 is also provided with radially spaced communication passages 224. A check valve 228 is provided within the increased-diameter space 226 and is upwardly spring-biased by a spring 229.

It should be appreciated that according to the invention, a desired damping force characteristic can be obtained with an elastic ring member serving as a check valve, e.g., in the extension stroke of the above-described type of hydraulic shock absorber. Particularly, when a tapered piston rod is used the elastic ring member functions to prevent a sudden reduction of the damping force, e.g., in the extension stroke, and the damping force in the extension stroke is controlled by a separately provided orifice. In this manner, the invention effectively solves the problems inherent in the exemplary hydraulic shock absorbers described hereinabove, and improves the performance of the hydraulic shock absorber. Such result is achieved by the provision of the elastic ring member on the piston rod in a predetermined portion thereof and the provision of a separate compensation path, as described in detail hereinabove.

Although there have been described what are at present considered to be the preferred embodiments of the invention, the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A hydraulic shock absorber comprising:
   telescopically-connected inner and outer cylinders;
   a first one of said cylinders including a piston rod extending coaxially therewith from a closed end wall of said first cylinder and provided with a piston thereon;
   a second one of said cylinders including a closed end wall at one end thereof and a first radial partition wall adjacent the other end of said second cylinder formed with a hole through which said piston rod extends and dividing an enclosed space defined by said inner and outer cylinders;
   said piston being located in said second cylinder;
   said second cylinder further including a second radial partition wall extending between said first partition wall and said piston and formed with a hole through which said piston rod extends;
   said second partition wall being further formed with a plurality of radially-spaced oil path apertures;
   an elastic ring member closely and slidably fitted on said piston rod between said first and second partition members so as to abut against said first partition wall to sealingly close said hole therein during extension stroke movement of said piston rod and to abut against said second partition wall to sealingly close said hole therein during compression stroke movement of said piston rod, such that said elastic ring member, when in abutting engagement with either of said partition walls, can be forced to slide along said piston rod in relation to further movement of said piston rod;
   said piston rod being provided therethrough with an axial oil path providing communication between a chamber defined by said first cylinder between said end wall of said first cylinder and said first partition wall and a chamber defined by said second cylinder between said end wall of said second cylinder and said piston; and
   a check valve provided within said axial oil path, said check valve being adapted to open said axial oil path during the extension stroke of said hydraulic shock absorber.

2. A hydraulic shock absorber according to claim 1, wherein:
   said piston rod has a tapered form having substantially different opposite end diameters so as to define a variable orifice between said hole of said first partition wall and said piston rod with movement of said piston rod relative to said hole.

3. A hydraulic shock absorber according to claim 2, wherein:
   said piston rod having said tapered form has the diameter thereof progressively reduced toward the piston end thereof.

4. A hydraulic shock absorber according to claim 1, wherein:
   said elastic ring member includes radially inner upper and lower lip portions extending radially inwardly, and an inner intermediate protruded portion having valleys formed between said lip portions and said intermediate protruded portion.

5. A hydraulic shock absorber according to claim 1, wherein:
   said elastic ring member has an inner concave surface with upper and lower lip portions formed at upper and lower edges thereof.

6. A hydraulic shock absorber according to claim 1, wherein:
   said elastic ring member includes upper and lower lip portions extending radially inwardly, and an inner intermediate convex portion.

7. A hydraulic shock absorber according to claim 1, wherein:
   said elastic ring member has a substantially oval sectional profile with the long axis thereof extending parallel to the axis of said piston rod, and includes:
   an inner protruded portion;
   said inner protruded portion including upper and lower lip portions and an intermediate convex portion;
   the distance between the edges of said upper and lower lip portions being smaller than the length dimension of the remaining portion of said elastic ring member; and
   said lip portions and said remaining portion of said elastic ring member defining valleys therebetween.

8. A hydraulic shock absorber according to claim 7, wherein:
said remaining portion of said elastic ring member is provided at the upper and lower edges thereof with respective ridges.

9. A hydraulic shock absorber according to claim 4, 5, 6, 7 or 8, wherein:
said elastic ring member is formed with an outer peripheral annular groove, and a ring-shaped spring is fitted in said groove.

10. A hydraulic shock absorber according to claim 1, wherein:
said second partition wall is provided with a substantially ring-shaped wall adapted to surround said elastic ring member.

11. A hydraulic shock absorber according to claim 10, wherein:
said substantially ring-shaped wall comprises a substantially axially extending wall of a depressed portion of said second partition wall, said depressed portion including a radially extending bottom wall portion having provided therein said hole penetrated by said piston rod.

12. A hydraulic shock absorber according to claim 10, wherein:
said substantially ring-shaped wall extends axially upwardly from an upper surface of said second partition wall member.

13. A hydraulic shock absorber according to claim 12, wherein said substantially ring-shaped wall has a curved outer surface.

14. A hydraulic shock absorber according to claim 10, wherein said substantially ring-shaped wall comprises an axially extending wall, a portion of which extends axially upwardly from said second partition wall and another portion of which extends as a depressed portion of said second partition wall.

15. A hydraulic shock absorber according to claim 14, wherein:
the outer surface of said portion of said substantially ring-shaped wall extending upwardly from said second partition wall is curved.

16. A hydraulic shock absorber according to claim 1, wherein:
said first cylinder comprises said outer cylinder; and said second cylinder comprises said inner cylinder.

* * * * *